(12) United States Patent
Donnet et al.

(10) Patent No.: US 11,959,574 B2
(45) Date of Patent: Apr. 16, 2024

(54) FLUID CONNECTION DEVICE

(71) Applicant: HUTCHINSON, Paris (FR)

(72) Inventors: Christophe Donnet, Villemandeur (FR); Nicolas Dupont, Pannes (FR)

(73) Assignee: HUTCHINSON, Paris (FR)

( * ) Notice: Subject to any disclaimer, the term of this patent is extended or adjusted under 35 U.S.C. 154(b) by 152 days.

(21) Appl. No.: 17/422,519

(22) PCT Filed: Jan. 13, 2020

(86) PCT No.: PCT/EP2020/050693
§ 371 (c)(1),
(2) Date: Jul. 13, 2021

(87) PCT Pub. No.: WO2020/148232
PCT Pub. Date: Jul. 23, 2020

(65) Prior Publication Data
US 2022/0090719 A1    Mar. 24, 2022

(30) Foreign Application Priority Data

Jan. 15, 2019 (FR) ..................................... 1900367

(51) Int. Cl.
*F16L 37/252* (2006.01)
(52) U.S. Cl.
CPC ................................. *F16L 37/252* (2013.01)
(58) Field of Classification Search
CPC .................................................... F16L 37/252
See application file for complete search history.

(56) References Cited

U.S. PATENT DOCUMENTS

| 554,666 A | * | 2/1896 | Feltner | F16L 37/252 |
| | | | | 285/259 |
| 2,647,768 A | * | 8/1953 | Exton | F16L 37/252 |
| | | | | 285/376 |
| 2006/0219023 A1 | * | 10/2006 | Bordonaro | F16L 37/2445 |
| | | | | 73/756 |

(Continued)

FOREIGN PATENT DOCUMENTS

| DE | 449339 C | | 9/1927 |
| DE | 521442 C | * | 3/1931 |

(Continued)

*Primary Examiner* — Zachary T Dragicevich
*Assistant Examiner* — James A Linford
(74) *Attorney, Agent, or Firm* — BROWDY AND NEIMARK, P.L.L.C.

(57) ABSTRACT

Disclosed is a fluid connection device (10) comprising a male connector (12) and a female connector (14), which are configured to be fitted one inside the other along an axis X so as to produce a fluid connection, and at least one annular seal (16) carried by one of the connectors and configured to engage with the other connector in order to ensure a seal between the connectors, the connectors being configured to be fastened to each other by resilient snap-fastening and to retain, after fastening, at least one degree of freedom with respect to each other, characterised in that the connectors are fastened together by a double fastening by resilient snap-fastening and by bayonet, this resilient snap-fastening being configured to be irreversible without deterioration so that, after fastening, the device cannot be dismantled without deterioration.

17 Claims, 14 Drawing Sheets

(56) References Cited

U.S. PATENT DOCUMENTS

2011/0148107 A1* 6/2011 Blivet ................. F16L 37/0841
                                                           285/402
2020/0072399 A1    3/2020 Gaudiau et al.

FOREIGN PATENT DOCUMENTS

| EP | 2829784 A1 |   | 1/2015 |
|----|-----------|---|--------|
| FR | 616980 A  | * | 2/1927 |
| FR | 3059756 A1 |  | 6/2018 |

* cited by examiner

[Fig. 1]
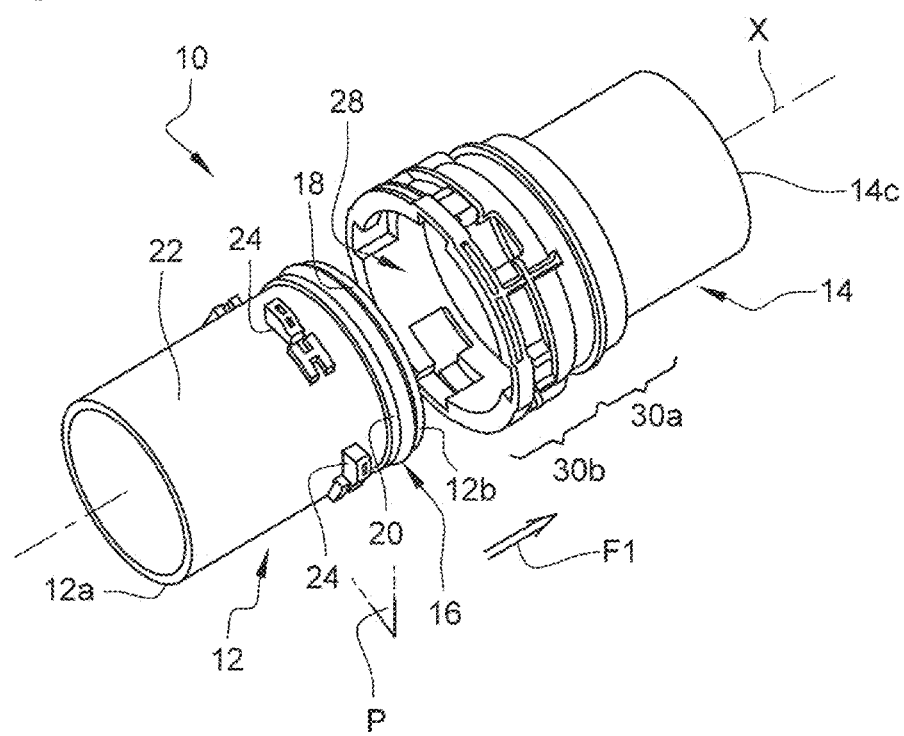

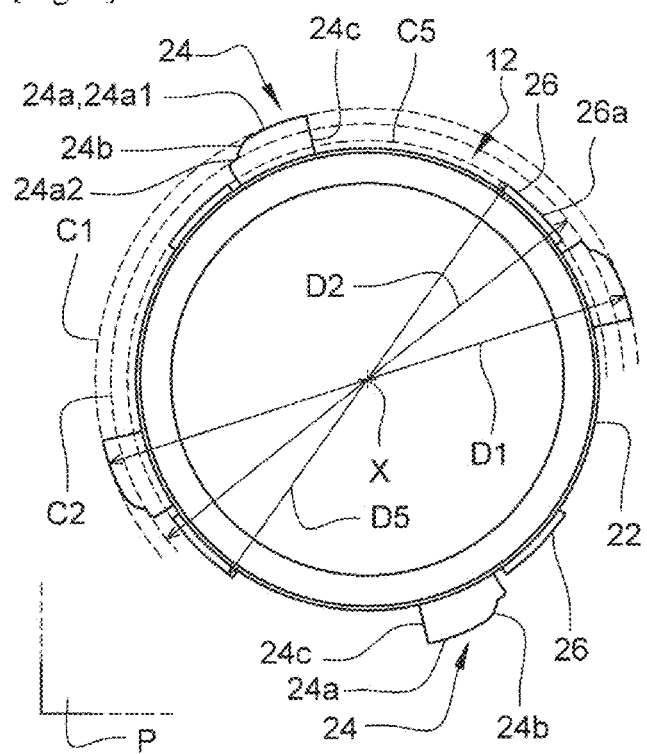

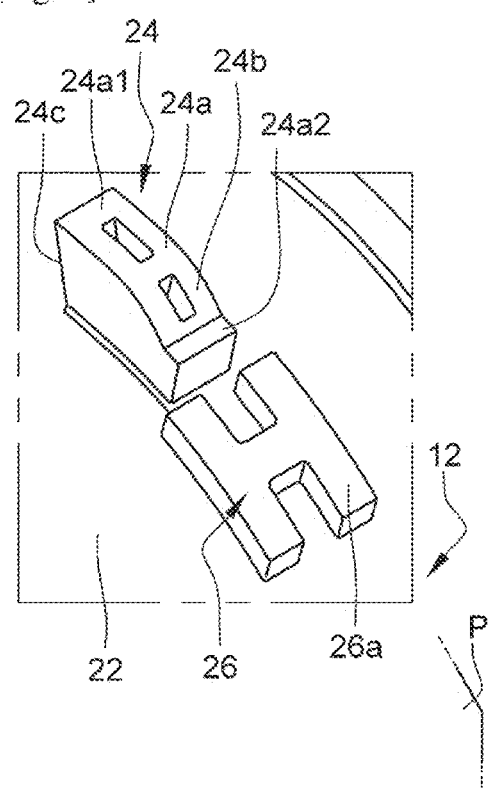

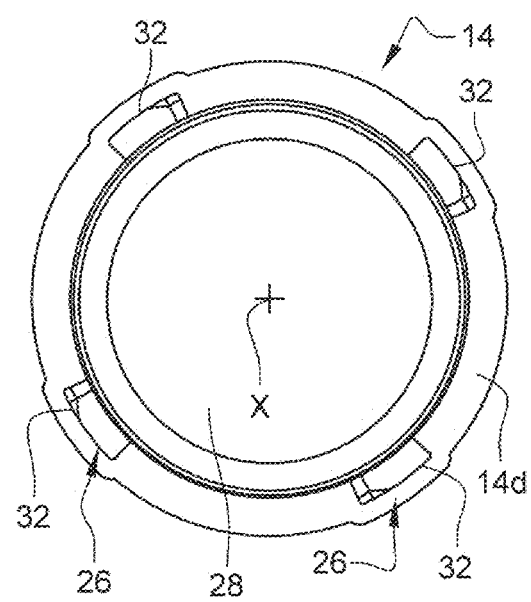
[Fig. 4]

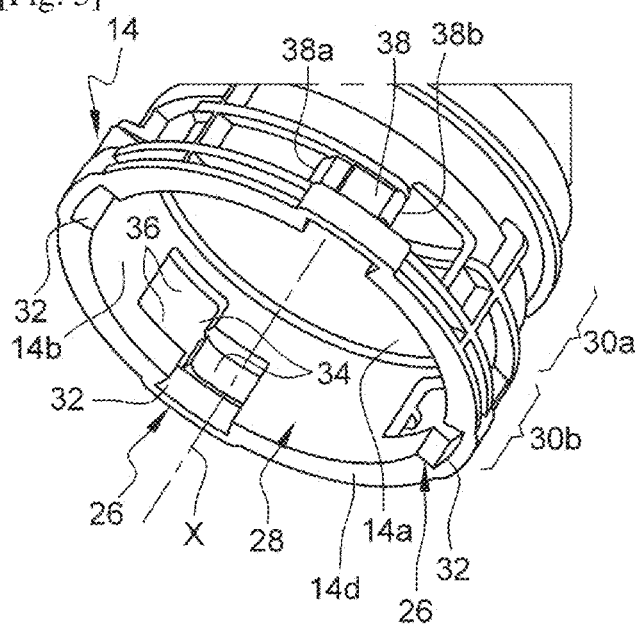
[Fig. 5]

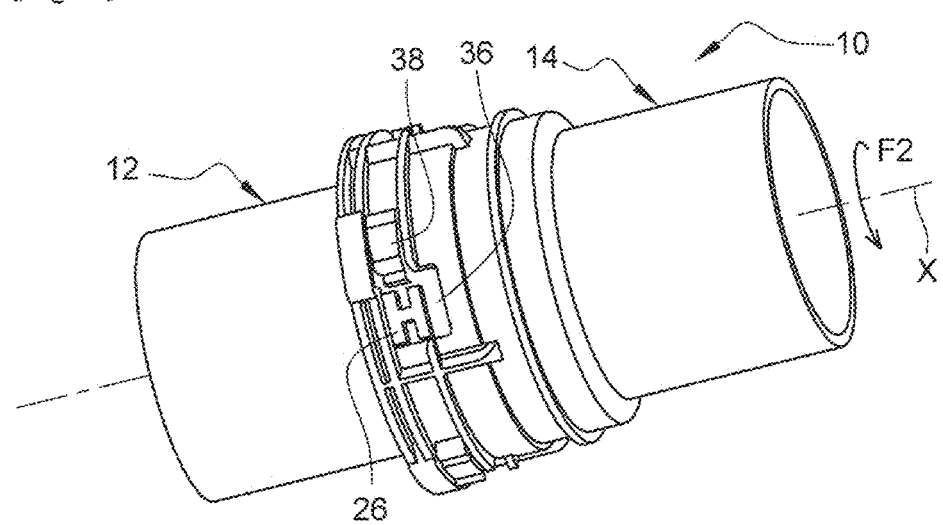
[Fig. 6]

[Fig. 7]
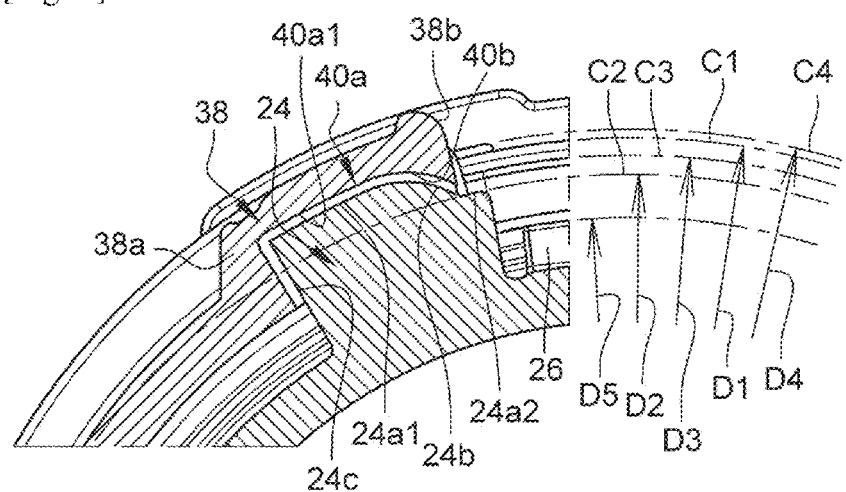

[Fig. 8]
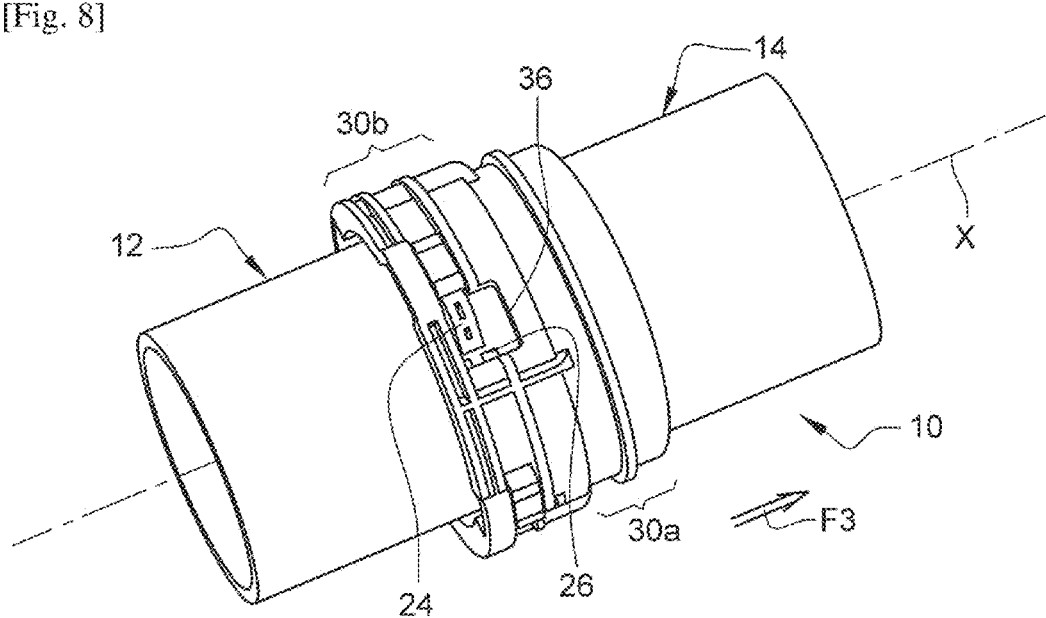

[Fig. 9]
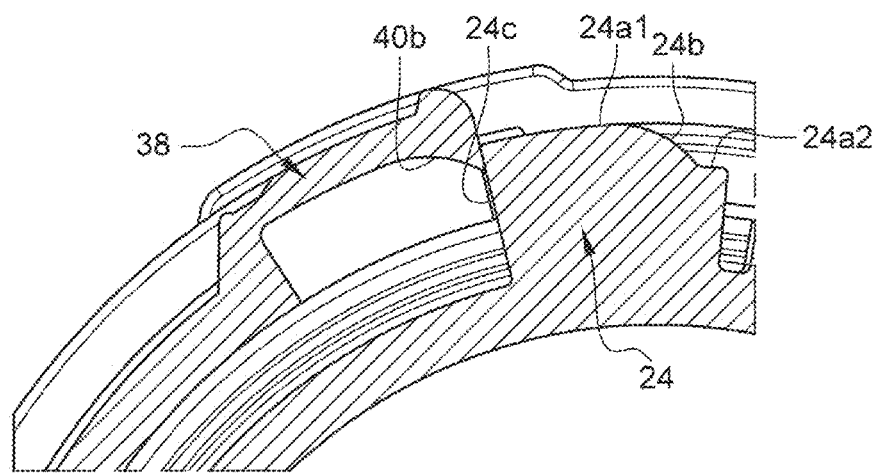

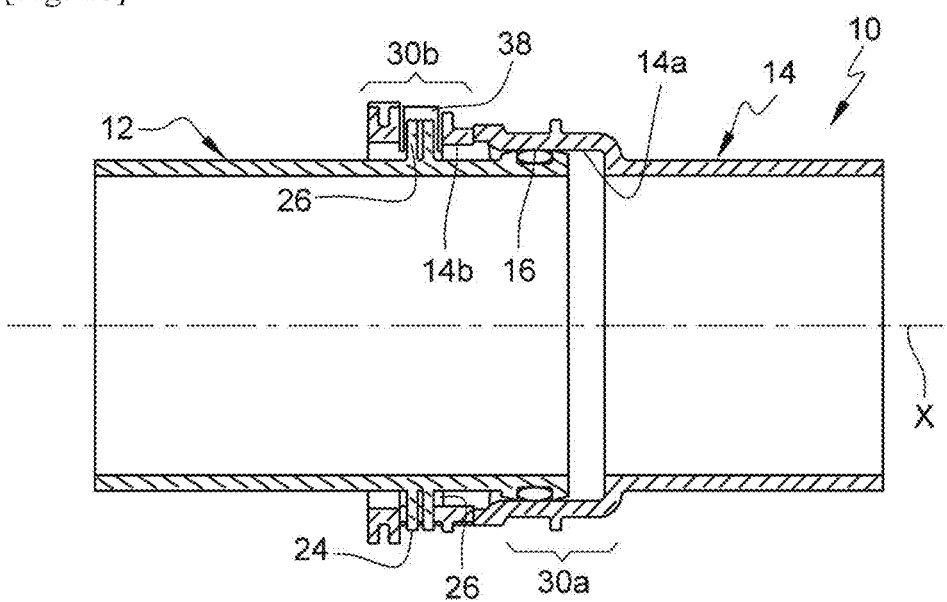
[Fig. 10]

[Fig. 11]
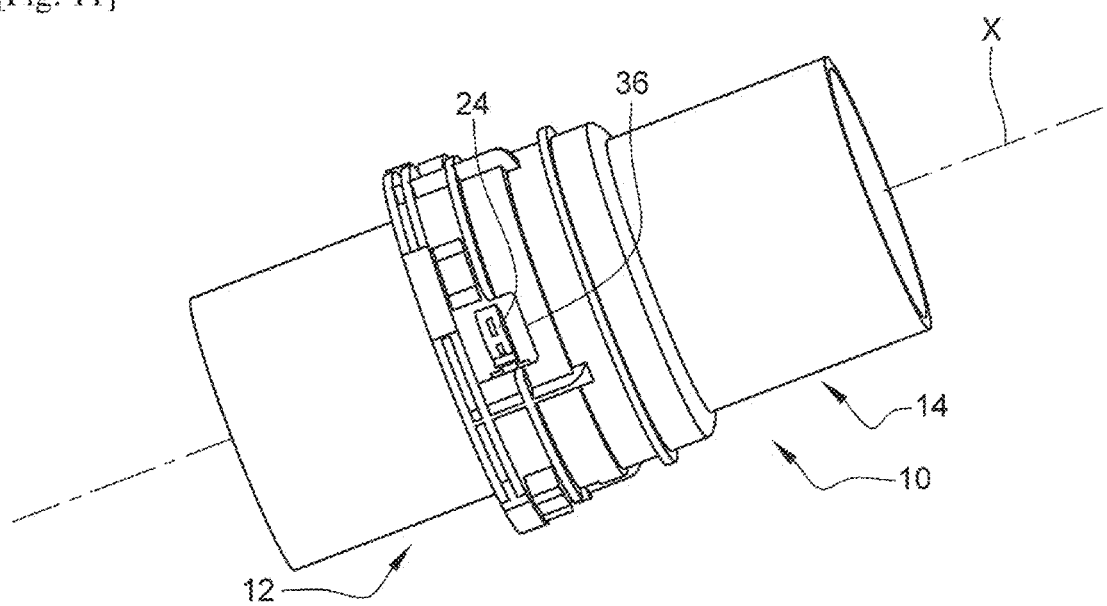

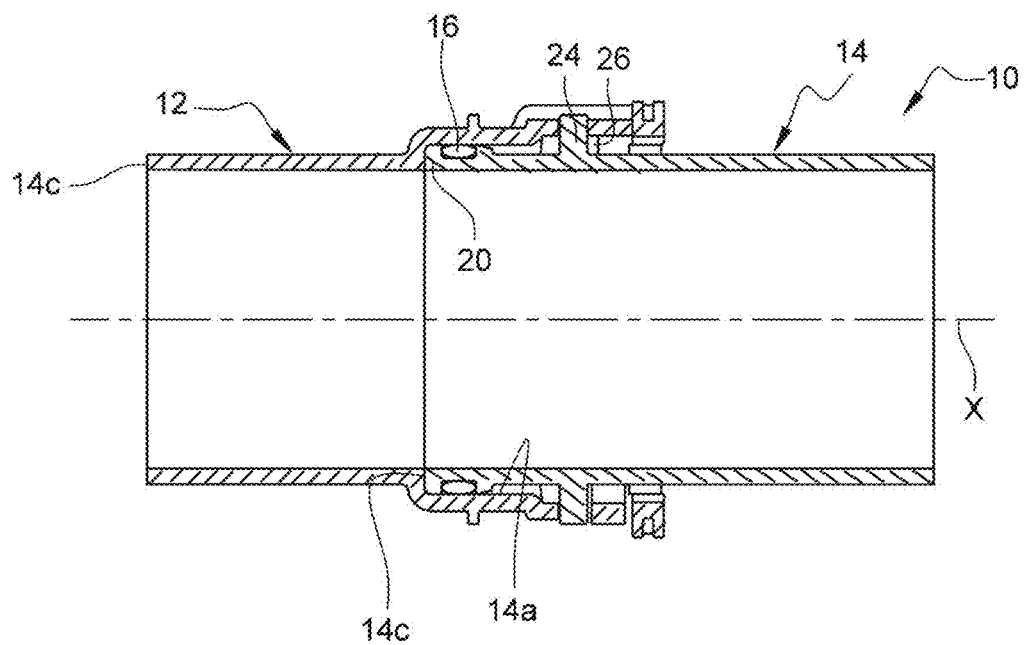
[Fig. 12a]

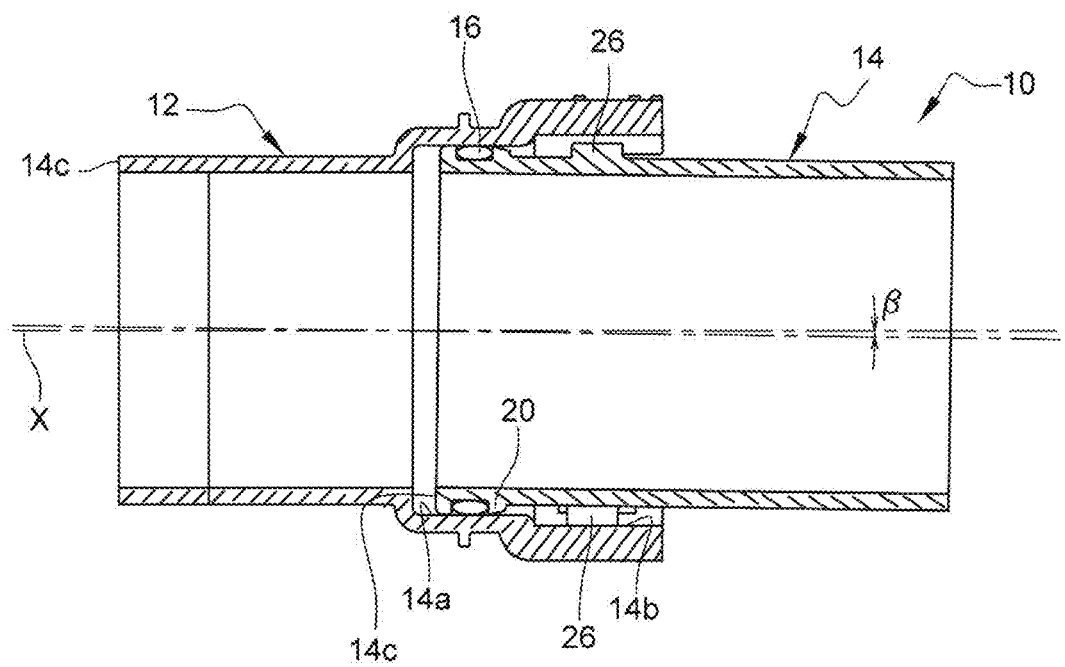
[Fig. 12b]

[Fig. 13]
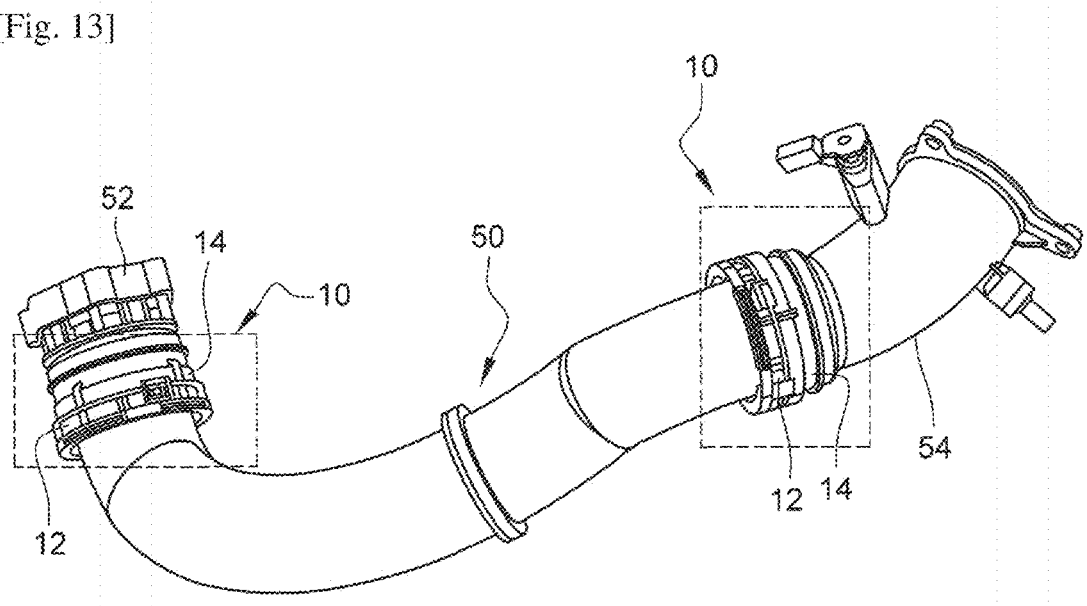

FLUID CONNECTION DEVICE

TECHNICAL FIELD OF THE INVENTION

The present invention relates to a fluid connection device for example for a motor vehicle, in particular for fluid circuits installed in the engine compartment (for example air or water circuits) or under the body of a vehicle (for example a fuel circuit or an "SCR" selective catalytic reduction circuit). Alternatively, it could be used in another field e.g. aeronautics, marine, etc.

TECHNICAL BACKGROUND

The purpose of a fluid connection device, such as a quick connector, is to connect two interfaces or connectors together in a sealed, simple, precise and reliable manner. This operation must be carried out in a few seconds and preferably without special tools.

A device of this type comprises two tubular connectors, respectively male and female, intended to be fitted into each other. The device is completed by an annular seal which ensures a seal of the connection.

A connection device should preferably allow at least one degree of freedom between the connections, in order to allow for assembly clearance. In the current technique, the solutions proposed require the use of numerous parts and do not always allow a degree of freedom with sufficient displacement or movement capacity.

The present invention provides an improvement to this technology, which meets the above-mentioned need in a simple, effective and economical manner.

SUMMARY OF THE INVENTION

The invention proposes a fluid connection device for this purpose, comprising:
- a male connector and a female connector, which are configured to be fitted into each other along an axis X so as to produce a fluid connection,
- at least one annular seal carried by one of the connectors and configured to cooperate with the other of the connectors in order to ensure a seal between the connectors,
- the connections being configured to be fastened to each other by resilient snap-fastening and to retain after fastening at least one degree of freedom with respect to each other, characterised in that the connectors are fastened together by a double fastening by resilient snap-fastening and by bayonet, the resilient snap-fastening being configured to be irreversible without deterioration so that, after fastening, the device cannot be dismantled without deterioration, and in that the male connector comprises members configured to cooperate both by resilient snap-fastening and bayonet effect with complementary elements of the female connector.

The device according to the invention can thus comprise only three parts, namely the connectors and a seal, which simplifies the device and limits its size. The device is equipped with two types of fastening, resilient snap-fastening and bayonet. The snap-fastening mechanism is irreversible so that the device cannot be dismantled without the risk of deterioration. This avoids the risk of accidental disassembly of the device during operation and also during transport and handling of parts equipped with such devices. If a pipe is equipped with a pre-assembled device, this pre-assembly would be ensured until the pipe is mounted, for example, on any engine or vehicle, and would ensure a post-mounting seal.

In the present application, "deterioration" to a part means cutting or machining the part, or plastically deforming or breaking the part.

The device according to the invention may comprise one or more of the following characteristics, taken alone or in combination with each other:
- the connectors are configured to retain, after fastening, at least one degree of freedom selected from translation along the axis X over a predetermined distance, rotation around the axis X over a predetermined angle, and articulation with respect to a point located on the axis X and with a predetermined angular displacement;
- the members project from an outer annular surface of the male connector;
- each of the members comprises a radially outer surface comprising a slope inclined in the circumferential direction with respect to the axis X;
- the radially outer surface comprises a first circumferential end located on a circumference of diameter D1 and an opposite second circumferential end located on a circumference of diameter D2, which is smaller than D1, each of the members comprising an abutment side surface located on the side of said first circumferential end;
- the male connector further comprises pads projecting from its outer annular surface and configured to slidingly cooperate with an inner annular surface of the female connector;
- the pads and the members are located substantially in the same plane transverse to the axis X, the number of pads being equal to the number of members and each pad being disposed between two adjacent members;
- the elements comprise slots and/or windows formed in the female connector;
- the female connector comprises an opening for engaging the male connector, this opening being delimited by a peripheral annular edge comprising axial windows for engaging the members of the male connector by axial translation;
- each window is connected to a first circumferential slot adapted to receive the corresponding member during a circumferential movement of the male connector in the female connector;
- the first slot is connected to a second axial slot to ensure a degree of freedom in axial translation of the male connector in the female connector;
- in the area of connection of each window to the corresponding circumferential slot, the female connector comprises a wall comprising a radially inner surface having a slope inclined in the circumferential direction with respect to the axis X;
- the radially inner surface comprises a first circumferential end located on a circumference of diameter D3 and an opposite second circumferential end located on a circumference of diameter D4, which is greater than D3, the wall comprising an abutment side surface located on the side of said first circumferential end;
- the wall is formed by a circumferential tab resiliently deformable in the radial direction;
- the slots and/or windows are non-regularly distributed around said axis X to provide the female connector with a keying property;

the male connector is formed in a single piece, the female connector is formed in a single piece, and the device consists of the male connector, the female connector and said at least one seal;

the male connector comprises an annular groove for housing the annular seal, the annular groove being formed in an annular boss which extends around the axis X and which has a convexly rounded shape in cross-section providing the male connector with a swivelling ability within the female connector.

BRIEF DESCRIPTION OF THE FIGURES

The invention will be better understood and other details, characteristics and advantages of the invention will become clearer on reading the following description made by way of non-limiting example and with reference to the annexed drawings in which:

FIG. 1 is a schematic exploded perspective view of a fluid connection device according to the invention;

FIG. 2 is a schematic front view of a male connector of the device of FIG. 1;

FIG. 3 is a larger scale detail view of a part of the male connector of the device of FIG. 1;

FIG. 4 is a schematic front view of a female connector of the device of FIG. 1;

FIG. 5 is a larger scale detail view of part of the female connector of the device of FIG. 1;

FIG. 6 is a schematic perspective view of the device of FIG. 1, after engagement of the male connector into the female connector by axial translation of the male connector into the female connector;

FIG. 7 is a partial schematic cross-sectional view of a resilient snap-fastening member of the male connector, in a position prior to its resilient snap-fastening cooperation with a tab of the female connector;

FIG. 8 is a schematic perspective view of the device of FIG. 1, after rotation of the male connector in the female connector;

FIG. 9 is a partial schematic cross-sectional view of a resilient snap-fastening member of the male connector, in a position following its resilient snap-fastening cooperation with a tab of the female connector;

FIG. 10 is a schematic axial cross-sectional view of the device of FIG. 8, the cross-sectional plane passing through the resilient snap-fastening members of the male connector;

FIG. 11 is a schematic perspective view of the device of FIG. 1, after a further translation of the male connector into the female connector;

FIG. 12a is a similar view to FIG. 10 with the connectors in the position shown in FIG. 11;

FIG. 12b is another view similar to FIG. 10 where the connectors are in the position of FIG. 11 and are angled to each other; and FIG. 13 is a schematic perspective view of a duct fitted with two devices according to the invention.

DETAILED DESCRIPTION OF THE INVENTION

FIGS. 1 to 12 illustrate an embodiment of a fluid connection device 10 according to the invention, for example for a fluid circuit of a motor vehicle. However, this application is not limiting.

The device 10 essentially comprises three parts, namely a male connector 12, a female connector 14, and at least one annular seal 16, for example an O-ring.

The connectors 12 and 14 are intended to be fitted into each other and to be integral with a pipe or component to be connected.

These parts will be described one after the other in the following, and then their mutual cooperation and the fastening of the connectors 12, 14 will be described.

Male Connector 12

The male connector 12 has a tubular shape with an axis X. It is intended to be engaged at least in part with the female connector 14 and comprises an axial end 12a for attachment to a pipe or component, as described above.

In the example shown, the male connector 12 carries the seal 16. The seal 16 is housed in an outer annular groove 18 of the connector 12. The groove 18 is here formed in an outer annular boss 20 of the male connector 12, which is located at the opposite axial end 12b of the male connector 12. The boss 20 projects from an outer cylindrical surface 22 of the connector 12 (FIG. 1).

The boss 20 extends around the axis X and is generally convexly rounded in axial section so as to define a spherical surface portion. This spherical surface is configured to slidingly cooperate an internal, preferably cylindrical surface 14a of the female connector 14 so as to provide the connector 12 with an ability to swivel within the connector 14, as will be described in more detail below (FIGS. 5 and 10).

The connector 12 further comprises members 24 configured to resiliently cooperate complementary elements 26 of the female connector 14.

In the example shown, the members 24 are formed by studs which are, for example, generally parallelepipedic in shape and which are formed to project from the surface 22. There are four of them here and they are evenly spaced around the axis X. They are located substantially in the same plane P perpendicular to the axis, and located between the ends 12a, 12b.

Each member 24 or stud comprises a radially outer surface 24a which is free and which has a slope 24b oriented in the circumferential direction with respect to the axis X. The surface 24a has two plates 24a1, 24a2 separated from each other by the slope 24b.

The plate 24a1 extends between a first circumferential end of the member and the slope 24b, this circumferential end being located on a circumference C1 centred on the axis X, which has a diameter D1. The plate 24a1 extends substantially tangentially with respect to this circumference C1.

The plate 24a2 extends between the slope 24b and a second circumferential end of the member, this second end being located on a circumference C2 centred on the axis X, which has a diameter D2 which is less than D1. The plate 24a2 extends substantially tangentially with respect to this circumference C2. Furthermore, the plate 24a2 has a circumferential extent around the axis X which is less than that of the plate 24a1.

Each member 24 further comprises an abutment side surface 24c which extends radially between the surface 22 and the first circumferential end of that member (and in particular between the surface 22 and the plate 24a1).

The male connector 12 further comprises pads 26 projecting from the surface 22. The pads 26 are four in number in the example shown and are evenly distributed around the axis X. They are located, for example, in the aforementioned plane P and each pad 26 may be arranged between two adjacent members 24 or studs.

As can be seen in the drawings, each pad 26 may form an H shape, although this is not limiting. Each pad 26 comprises a radially outer surface 26a for bearing and sliding on an inner, preferably cylindrical, surface 14b of the female connector 14 (FIGS. 5 and 10). This surface 26a is located on a circumference C5 of diameter D5.

The male connector 12 is preferably formed in one piece, as in the example shown.

The male connector 12 is for example made of polyamide or aluminium.

Female Connector 14

The female connector 14 has a tubular shape with an axis X. It also comprises an axial end 14c for attachment to a pipe or component, as mentioned above.

The female connector 14 is shaped to extend around the male connector 12 and therefore comprises an aperture 28 adapted to the shape and dimensions of the male connector 12 to receive it by male-female engagement.

In the example shown, the female connector 14 comprises two coaxial sections 30a, 30b. A first section 30a, of smaller diameter, is located on the end 14c side and comprises the aforementioned internal surface 14a. A second, larger diameter section 30b is located on the opposite side of the end 14c and comprises the inner surface 14b. The inner surface 14a is thus of smaller diameter than the inner surface 14b in the example shown.

On the side opposite the end 14c, the female connector 14 comprises a peripheral edge 14d defining the opening 28 and comprising windows 32 for axial passage of the members 24 of the male connector 12 (FIG. 5). Each window 32 has an orientation parallel to the axis X and here has a general inverted U shape in cross-section in that, in addition to being axially through, it opens radially inwardly with respect to the axis X.

As can be seen in the drawings, each window 32 is formed in the section 30b and can be likened to an axial notch formed in the surface 14b.

The female connector 14 further comprises slots for fastening with bayonet effect the male connector 12 into the female connector 14.

Each window 32 is connected at its axial end opposite the edge 14d to a first circumferential end of a first slot 34 which extends circumferentially around the axis X and is therefore a circumferential slot. The second circumferential end of this slot 34 is in turn connected to a first axial end of a second slot 36 which extends along the axis X and is therefore an axial slot. The second axial end of this slot 36 is located on the side of the end 14c. The combination of two slots 34, 36 connected to each other forms a substantially L-shaped configuration. The association between the two slots 34, 36 and the associated window 32 forms substantially a Z (FIG. 5).

It can be seen from the drawings that the slots 36 do not comprise a ceiling, in that they are continuous in the radial direction. The portion of each slot 34, which is connected to the corresponding slot 36, also has no ceiling. However, the other portion of each slot 34, which is connected to the corresponding window 32, comprises a (radially outer) ceiling wall. This portion of the slot 34 thus opens radially inwards but not outwards.

In the example shown, this ceiling wall is formed by a resiliently flexibly deformable tab 38. Each tab 38 has a generally elongated shape in the circumferential direction and comprises a first circumferential end 38a connected to the rest of the connector 14, and a second free circumferential end 38b which is located on the side of the slot 36 and is capable of deforming in the radial direction (FIG. 7).

The shape of the tab 38 can be better appreciated in FIG. 7. The tab 38 comprises an inner surface 40a which has a plate 40a1 and a circumferentially oriented slope 40b. The plate 40a1 extends between the end 38a and the slope 40b, the slope 40b being located at the end 38b.

The plate 40a1 has an orientation substantially tangent to a circumference C4 centred on the axis X and having a diameter D4. The slope 40b forms a radially inwardly directed tooth at the end 38b, the radially inner end of which is located on a circumference C3 having an inner diameter D3. In the example shown, D4 is greater than D1, D2 and D3. D3 is smaller than D1 and larger than D2.

The assembly and fastening of the connectors 12, 14 will now be described.

FIG. 1 shows a first step of assembling the connectors 12, 14 in which they are axially aligned and ready to be axially engaged with each other (arrow F1). For this purpose, the members 24 or studs of the male connector 12 are axially aligned with the windows 32 of the female connector 14. The members 24 are dimensioned, in particular radially and circumferentially, so that they can be engaged in and pass through the windows 32 to reach the slots 34.

In the example shown, the members 24, the windows 32 and the slots 34 are evenly spaced around the axis X. Alternatively, this may not be the case in order to give the connectors a keying property. Of the four members 24, for example, three could be spaced at 90° to each other, and the last could be at 120° to one and 60° to another. This particular arrangement would allow an operator to indicate a necessary angular position of one of the connectors relative to the other of the connectors to allow engagement of one with the other.

At the end of this axial translation engagement of the male connector 12 into the female connector 14, the members 24 are radially inside the tabs 38 (FIGS. 6 and 7) and the pads 26 are inside the section 30b, at the slots 36 (FIG. 6). The diameter D5 of the pads 26 is less than the diameter of the surface 14b to allow this assembly and the aforementioned ability to swivel of the connectors 12, 14.

FIG. 6 and its arrow F2 show a further assembly step in which the male connector 12 is rotated around the axis X within the female connector through a given angle (e.g. of the order of 20°) in this case clockwise, so that the members 24 pass from the slots 34 to the slots 35. During this passage, they cooperate by resilient snap-fastening with the tabs 38, which results in: the circumferential bearing and sliding of the slopes 24b, 40b on each other, the resilient deformation of the tabs radially outwards and the sliding of the teeth of the tabs 38 on the slopes 24b and the plates 24a1 of the members 24, and finally the resilient return of the tabs 38 and of the teeth so that the latter can bear on the side surfaces 24c (FIG. 9).

At the end of this rotation of the male connector 12 in the female connector 14, the members 24 are in the slots 36 and the pads 26 are inside the surface 14a of the section 30b (FIG. 8).

FIG. 10 shows the positions of the members 24 and the pads 26 within the section 30b of the female connector 14. The seal 16 carried by the connector 12 cooperates in a sealing manner with the surface 14b of the section 30a of the connector 14. The pads 26 are able to bear on the surface 14b of the section 30b of the connector 14.

FIG. 8 and its arrow F3 show at least one of the degrees of freedom of the connector during assembly or operation, the male connector 12 being able to be moved in translation along the axis X inside the female connector 14. This is made possible by the fact that the slots 36 each have an axial dimension greater than the axial dimension of the corresponding member 24. Each member 24 can therefore move axially in the associated slot 36 and adopt an advanced position visible in FIGS. 11 and 12.

This ability is particularly important in providing the male connector 12 with the ability to swivel within the female connector 14. During this movement, which is represented schematically in FIGS. 12a and 12b by the angle β, the boss 20 slides over the inner surface 14a. The surface 14a cooperates with the seal 16 and is a sealing surface. The pads 26 cooperate with the surface 14b which limits β the angle of swivelling of the connectors, this angle being for example +/−15°, preferably +/−10°, and more preferably +/−5°. Insofar as this swivelling would amount to pivoting the male connector 12 relative to the female connector 14 in a plane passing through the axis X, a first of the members 24 which would be in this plane would be displaced towards the end 14c of the female connector in the slot 36, and the other of these members 24, diametrically opposite the first member, would be displaced on the opposite side.

The axial stroke between the connectors 12, 14, in the fastened position, may be defined by abutment of the members 24 against the edges of the slots 36, or it may be limited by abutment of the end 12b of the male connector 12 against an internal annular shoulder of the female connector 14. It is for example +/−20 mm, preferably +/−10 mm, and more preferably +/−6 mm.

The angular displacement between the connectors 12, 14, around the axis X and after fastening, can be defined by abutting the members 24 against the edges of the slots 36. This displacement is for example +/−15°, preferably +/−10°, and more preferably +/−5°.

Furthermore, the male connector 12 can swivel in the female connector 14, as mentioned above.

The angular displacements and movement strokes of the connectors in relation to each other enable to compensate for manufacturing tolerances of the parts. For example, if the manufacturing tolerances of the parts would lead to a risk of angular misalignment of the connectors by 3° around the axis X, it would be sufficient to provide an angular displacement of +/−5° around this axis to compensate for these manufacturing tolerances.

As can be seen in the drawings, and in particular FIG. 9, the surface 24c of each member 24 can come to rest on the tooth of the tab 38 and cannot return under this tab 38, so that the resilient snap-fastening here is irreversible.

FIG. 13 shows an example of the use of a device 10 according to the invention and in particular of two devices 10, a pipe 50 being equipped at each of its longitudinal ends with a device 10 for its connection to two end pieces 52, 54. The pipe 50 is, for example, integral with the male connectors 12 of the two devices and the end pieces are, for example, integral with the female connectors 14 of these devices 10 respectively.

The attachment of the connectors to the pipe 50 can be achieved in different ways. For example, a connector may be formed in one piece with the pipe. Alternatively, the connector may be added-on and permanently fastened, for example by welding, to the pipe, or it may be removably fastened to the pipe. The ends 12a, 14c of the connectors may be adapted accordingly.

The invention claimed is:

1. A fluid connection device, comprising:
   a male connector and a female connector, which are configured to be fitted one inside the other along an axis so as to produce a fluid connection,
   at least one annular seal carried by one of the connectors and configured to cooperate with the other of the connectors in order to ensure a seal between the connectors,
   the connectors being configured to be fastened to each other by resilient snap-fastening and to retain after fastening at least one degree of freedom with respect to each other,
   wherein the connectors are fastened together by a double fastening by resilient snap-fastening and by bayonet, the resilient snap-fastening being configured to be irreversible without deterioration so that, after fastening, the device cannot be dismantled without deterioration, and wherein the male connector comprises members configured to cooperate by resilient snap-fastening with complementary elements of the female connector, all said members being further configured to cooperate by bayonet effect with said complementary elements of the female connector,
   wherein the elements comprise slots and/or windows formed in the female connector,
   and wherein the slots and/or windows are non-regularly distributed around said axis to provide the female connector with a keying property.

2. A fluid connection device, comprising:
   a male connector and a female connector, which are configured to be fitted one inside the other along an axis so as to produce a fluid connection,
   at least one annular seal carried by one of the connectors and configured to cooperate with the other of the connectors in order to ensure a seal between the connectors,
   the connections connectors being configured to be fastened to each other by resilient snap-fastening and to retain after fastening at least one degree of freedom with respect to each other,
   wherein the connectors are fastened together by a double fastening by resilient snap-fastening and by bayonet, the resilient snap-fastening being configured to be irreversible without deterioration so that, after fastening, the device cannot be dismantled without deterioration, and wherein the male connector comprises members configured to cooperate both by resilient snap-fastening and bayonet effect with complementary elements of the female connector,
   wherein the members project from an outer annular surface of the male connector,
   wherein each of the members comprises a radially outer surface comprising a slope inclined in the circumferential direction with respect to the axis, and
   wherein the radially outer surface comprises a first circumferential end located on a circumference of a first diameter and a opposite second circumferential end located on a circumference of a second diameter, said second diameter being smaller than said first diameter, each of the members comprising an abutment side surface located on the side of said first circumferential end.

3. A fluid connection device, comprising:
   a male connector and a female connector, which are configured to be fitted one inside the other along an axis so as to produce a fluid connection, at least one annular seal carried by one of the connectors and configured to cooperate with the other of the connectors in order to ensure a seal between the connectors, the connectors being configured to be fastened to each other by resilient snap-fastening and to retain after fastening at least one degree of freedom with respect to each other, wherein the connectors are fastened together by a double fastening by resilient snap-fastening and by bayonet, the resilient snap-fastening being configured to be irreversible without deterioration so that, after fastening, the device cannot be dismantled without deterioration, and in that the male connector comprises members configured to cooperate both by resilient snap-fastening and bayonet effect with complementary elements of the female connector, wherein the members project from an outer annular surface of the male connector, wherein the male connector further comprises pads projecting from its outer annular surface and configured to slidingly cooperate with an inner annular surface of the female connector, and wherein the pads and the members are located substantially in the same plane transverse to the axis, the number of pads being equal to the number of members and each pad being disposed between two adjacent members.

4. A fluid connection device, comprising:

a male connector and a female connector, which are configured to be fitted one inside the other along an axis so as to produce a fluid connection, at least one annular seal carried by one of the connectors and configured to cooperate with the other of the connectors in order to ensure a seal between the connectors, the connectors being configured to be fastened to each other by resilient snap-fastening and to retain after fastening at least one degree of freedom with respect to each other, wherein the connectors are fastened together by a double fastening by resilient snap-fastening and by bayonet, the resilient snap-fastening being configured to be irreversible without deterioration so that, after fastening, the device cannot be dismantled without deterioration, and in that the male connector comprises members configured to cooperate both by resilient snap-fastening and bayonet effect with complementary elements of the female connector, wherein the female connector comprises an opening for engaging the male connector, this opening being delimited by a peripheral annular edge comprising axial windows for engaging the members of the male connector by axial translation, and wherein each window is connected to a first circumferential slot adapted to receive the corresponding member during a circumferential movement of the male connector in the female connector.

5. The device according to claim 4, wherein the connectors are configured to retain after fastening at least one degree of freedom selected from translation along the axis over a predetermined distance, rotation around the axis over a predetermined angle, and articulation with respect to a point located on the axis and with a predetermined angular displacement.

6. The device according to claim 4, wherein the members project from an outer annular surface of the male connector.

7. The device according to claim 6, wherein each of the members comprises a radially outer surface comprising a slope inclined in the circumferential direction with respect to the axis.

8. The device according to claim 6, wherein the male connector further comprises pads projecting from its outer annular surface and configured to slidingly cooperate with an inner annular surface of the female connector.

9. The device according to claim 8, wherein the pads and the members are located substantially in the same plane transverse to the axis, the number of pads being equal to the number of members and each pad being disposed between two adjacent members.

10. The device according to claim 4, wherein the elements comprise slots and/or windows formed in the female connector.

11. The device of claim 10, wherein the first slot is connected to a second axial slot to ensure a degree of freedom in axial translation of the male connector into the female connector.

12. The device according to claim 10, wherein, in the area of connection of each window to the corresponding circumferential slot, the female connector comprises a wall comprising a radially inner surface having a slope inclined in the circumferential direction with respect to the axis.

13. The device according to claim 12, wherein the radially inner surface comprises a first circumferential end located on a circumference of a first diameter and a opposite second circumferential end located on a circumference of a second diameter, said second diameter being greater than said first diameter, the wall comprising an abutment side surface located on the side of said first circumferential end.

14. The device according to claim 13, wherein the wall is formed by a circumferential tab resiliently deformable in the radial direction.

15. The device according to claim 10, wherein the slots and/or windows are non-regularly distributed around said axis to provide the female connector with a keying property.

16. The device according to claim 4, wherein the male connector is formed in a single piece, the female connector is formed in a single piece, and the device consists of the male connector, the female connector and said at least one seal.

17. The device according to claim 4, wherein the male connector comprises an annular groove for housing the annular seal, said annular groove being formed in an annular boss which extends around the axis and which has a convexly rounded shape in cross-section providing the male connector with a swiveling ability within the female connector.

* * * * *